United States Patent
Murphey et al.

(10) Patent No.: US 7,435,032 B1
(45) Date of Patent: Oct. 14, 2008

(54) RESILIENT JOINT FOR DEPLOYABLE STRUCTURES

(75) Inventors: Thomas W. Murphey, Albuquerque, NM (US); Eric L. Pollard, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 197 days.

(21) Appl. No.: 11/463,146

(22) Filed: Aug. 8, 2006

(51) Int. Cl.
*E05D 1/00* (2006.01)

(52) U.S. Cl. .......................... 403/220; 16/225; 16/226; 403/64; 403/113; 403/120; 403/291

(58) Field of Classification Search ............ 403/64, 403/65, 113, 117, 120, 220, 229, 291; 16/225, 16/226

See application file for complete search history.

(56) References Cited

U.S. PATENT DOCUMENTS

| | | | |
|---|---|---|---|
| 3,148,539 A | 9/1964 | Cook | |
| 3,386,128 A | 6/1968 | Vyvyan | |
| 3,473,758 A * | 10/1969 | Webb | 244/172.7 |
| 4,285,609 A | 8/1981 | Runyon | |
| 4,432,609 A | 2/1984 | Dueker et al. | |
| 4,869,552 A * | 9/1989 | Tolleson et al. | 403/220 |
| 5,133,108 A * | 7/1992 | Esnault | 16/225 |
| 5,196,857 A | 3/1993 | Chiappetta et al. | |
| 6,175,989 B1 | 1/2001 | Carpenter et al. | |
| 6,321,503 B1 | 11/2001 | Warren | |
| 6,343,442 B1 | 2/2002 | Marks | |
| 6,374,565 B1 | 4/2002 | Warren | |
| 6,378,172 B1 * | 4/2002 | Schrage | 16/225 |
| 6,772,479 B2 | 8/2004 | Hinkley et al. | |
| 6,910,304 B2 | 6/2005 | Warren | |

* cited by examiner

*Primary Examiner*—Michael P Ferguson
(74) *Attorney, Agent, or Firm*—James M. Skorich

(57) ABSTRACT

A resilient flexure has one end attached within a cavity in a rigid member, and the other end attached within a cavity in a structural mode. The cavities are shaped to limit the flexure's bend radius. The member and the node have mating surfaces that abut to constrain the amount of rotation of the member. The aforementioned elements are shaped to prevent the strain in the flexure from exceeding its design limit when the joint is at its maximum angular deflection and the attached member is fully collapsed.

10 Claims, 5 Drawing Sheets

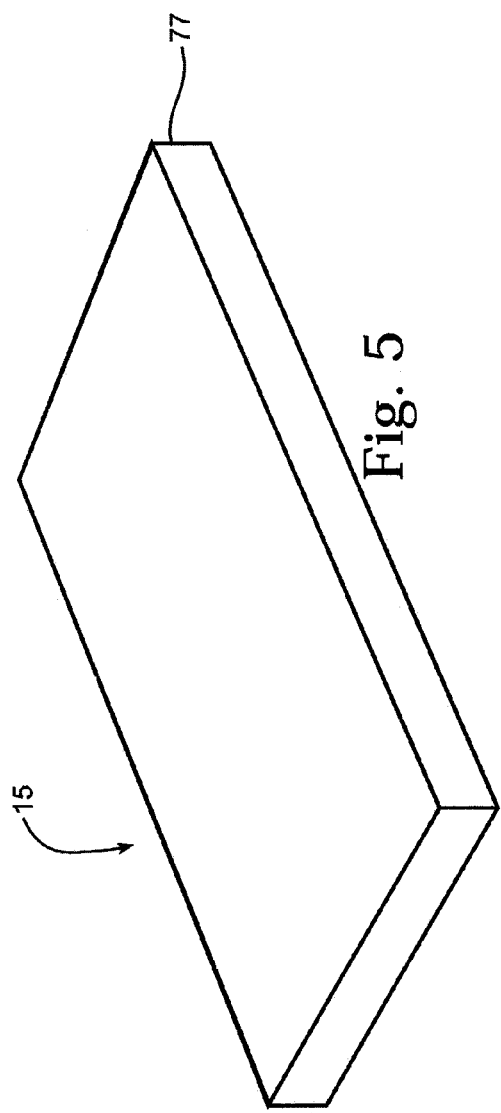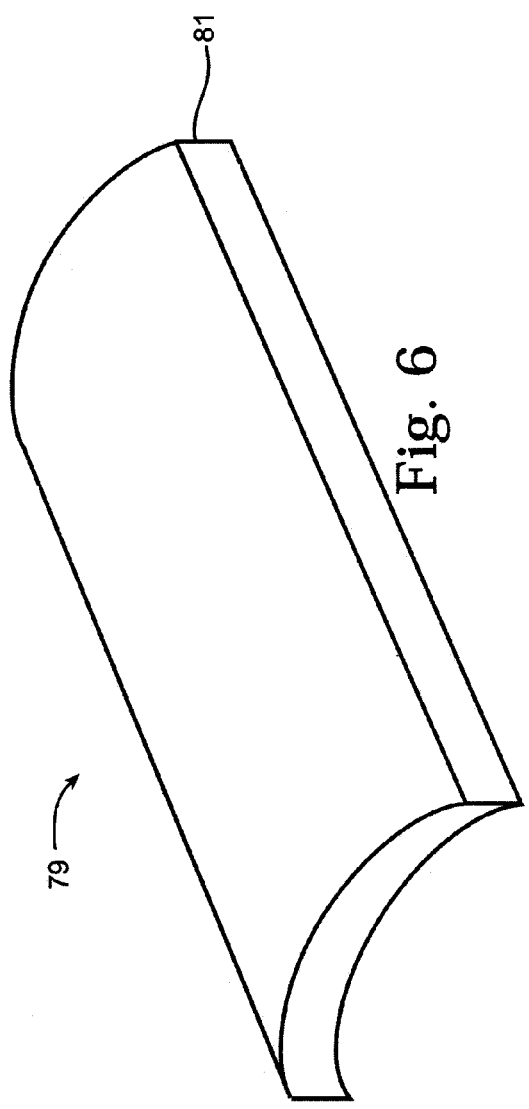

RESILIENT JOINT FOR DEPLOYABLE STRUCTURES

STATEMENT OF GOVERNMENT INTEREST

The invention described herein may be manufactured and used by or for the Government of the United States for all governmental purposes without the payment of any royalty.

BACKGROUND OF THE INVENTION

The present invention is related to a resilient monolithic joint for collapsing a structure to a reduced volume for storage, and subsequently restoring the structure to its useful configuration without requiring the application of an external force. More particularly, the present invention is a joint comprised of a piece of resilient, deformable material attached at one end to a rigid member and at its other end to a structural node. The material can be deformed when it is desired to collapse the member and, when it is desired to deploy the member, will return to its original shape in the absence of the application of an external force.

It is ofttimes necessary to transport a structure that occupies considerable volume. Where space on the vehicle being used to transport the structure is at a premium, e.g., a launch vehicle for reaching a space station, it is desirable to collapse the structure to occupy a considerably less volume and subsequently deploy the members to re-form the original structure without undue difficulty or requiring tools that would also occupy space as well as add mass.

One approach is to construct a joint of two parts where one part rotates relative to the other by means of sliding contact, for example, a ball and socket or a pin and clevis. The two parts require a clearance between them to allow for the desired relative rotation. The inherent problem is that, for a deployable structure using a plurality of such joints, clearance between each pair of joint parts is cumulative. This creates the problem known as "dead band," where movement at one end of a structure is not communicated to the other end until the intervening clearances are taken up. Where structural tolerances are small, "dead band" is a significant problem.

Furthermore, such joints require the application of force to deploy the collapsed members and re-form the original structure, i.e., at least as much force as was required to originally collapse each member. Deployment may also require the use of tools. For terrestrial applications, the foregoing may be considered as inconveniences; however, where the deployment is to be extraterrestrial, both of the foregoing present serious drawbacks.

In view of the aforementioned problems with two-piece joints, a monolithic joint comprised of a compliant material has been used. An example of such a joint is shown in U.S. Pat. No. 4,432,609. A further refinement is to use a joint material that is resilient and returns to its original shape without requiring the application of an external force. Examples of this approach are shown in U.S. Pat. Nos. 3,386,128; 5,196,857; 6,175,989 and 6,772,479. However, both such joints fail to ensure that the maximum design strain of the joint material is not exceeded when the attached member is rotated to an extreme position. This shortcoming could cause the joint to fail.

There a need in the art for a joint that avoids the "dead band" problem inherent to two-piece joints, as well as overcomes the shortcoming of monolithic joints in failing to ensure that the strain design limit of the joint material is not exceeded. The present invention is a monolithic joint that, by its intrinsic nature, avoids the "dead band" problem, while ensuring that the strain of the joint material does not exceed its design limit. Furthermore, the work expended to bend the joint material is stored and subsequently used to restore the joint to its neutral position without requiring the application of an external force. The present invention thus fulfills the aforementioned needs in the art.

SUMMARY OF THE INVENTION

Briefly, the present invention is comprised of a monolithic joint that allows a rigid, structurally efficient member to be rotatably collapsed and then subsequently deployed, without requiring the application of an external force, into its original configuration. It is thus suitable for both terrestrial as well as extraterrestrial applications. A flexure comprised of a less structurally efficient, resilient material has one end attached to a cavity in the member, while its other end is inserted into a cavity in a structural node. Both cavities are shaped to limit the flexure's bend radius. In addition, the member and the node have mating surfaces that abut to also constrain the amount of rotation.

The combination of these two design elements prevents the strain in the flexure from exceeding its design limit when the joint is at its maximum angular deflection and the attached member is fully collapsed. The joint of the present invention displays strength-stability and stiffness properties comparable to those of a kinematically equivalent, sliding contact mechanism, but without the "dead band" problem.

Other aspects and advantages of the present invention will become apparent from the following detailed description, taken in conjunction with the accompanying drawings, and illustrating by way of example the principles of the invention.

BRIEF DESCRIPTION OF THE DRAWINGS

FIG. 5 is a perspective view of a rectilinear flexure used in the joint of the present invention, which is also shown in section in FIGS. 1 and 3.

FIG. 6 is a perspective view of an arcuate flexure that may be used in the joint of the present invention.

DETAILED DESCRIPTION

Figure 1:
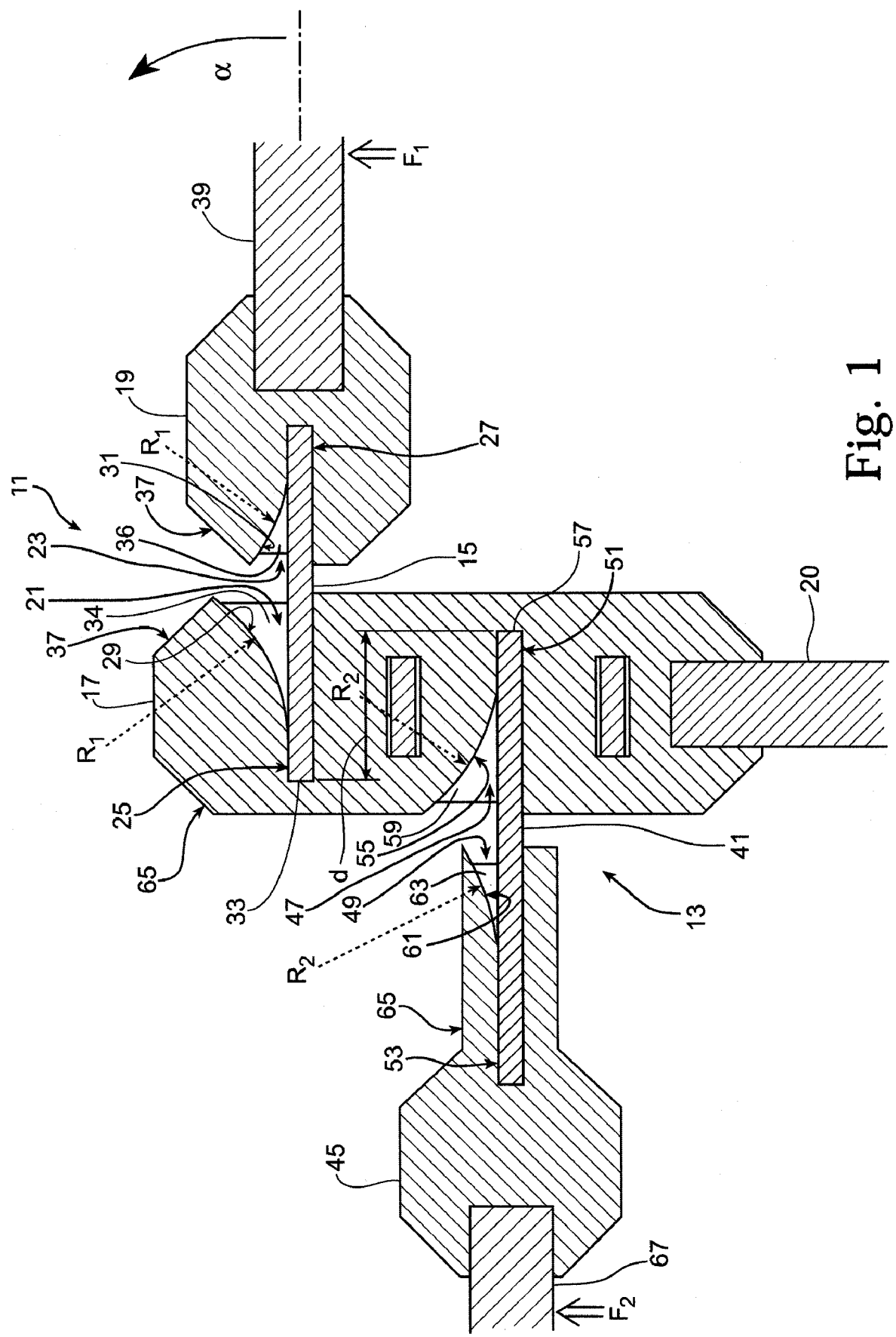
FIG. 1 is a cross-sectional view of two nested joints of the present invention, with the joints unbent and the respective attached rigid members in their deployed configuration.

Turning to the drawings, FIG. 1 illustrates flexure joints 11 and 13 of the present invention. Joint 11 is comprised of flexure 15, structural node 17, and structural connector 19. Node 17 is attached atop nonarticulating rigid member 20. Node 17 includes cavity 21 and connector 19 includes cavity 23. Flexure 15 is attached at its two ends, respectively, to base region 25 of cavity 21 and base region 27 of cavity 23. Cavity 21 includes curved surface 29 having radius of curvature $R_1$. Cavity 23 includes curved surface 31 also having radius of curvature $R_1$. Cavity 21 also includes base 33 and planar, parallel lateral sides, with only side 34 being shown. Cavity 23 also includes planar, parallel lateral sides, with only side 36 being shown. Node 17 and connector 19 include mating surfaces 37. Member 39 is fixedly attached to connector 19.

Joint 13 is comprised of flexure 41, node 17, and connector 45. Node 17 also includes cavity 47, and connector 45 includes cavity 49. Flexure 41 is attached at its two ends, respectively, to base region 51 of cavity 47 and base region 53 of cavity 49. Cavity 47 includes curved surface 55 having radius of curvature $R_2$, base 57, and planar, parallel lateral sides, with only side 59 being shown. Cavity 49 includes curved surface 61 also having radius of curvature $R_2$, as well as parallel lateral sides, with only side 63 being shown. Node 17 and connector 45 include mating surfaces 65. Member 67 is fixedly attached to connector 45.

Flexures 15 and 41 are composed of a resilient material such that after each is bent or otherwise deformed from its unstrained or neutral shape, i.e., the flat shape shown in FIG. 1, each of them stores as potential energy the work expended to deform them, and thus tends to return to its undeformed, neutral shape. Such resilient materials include spring steel, Copper-Beryllium alloy, unreinforced plastic, polymer fiber reinforced plastic, fiber glass reinforced plastic, carbon fiber reinforced plastic, and various shape memory alloys. The aforementioned materials are well known to those skilled in the mechanical and material arts, and any such material may be used depending upon the desired modulus and strain-to-failure properties, as will become readily apparent from the following discussion.

Near equiatomic Nickel-Titanium is an example of a shape memory alloy that may be used to form flexures 15 and 41. The foregoing alloy, in addition to creating a restoring moment to enable self-deployment, permits the recovery of strains greater than the strain recovery for non-phase changing materials. Moreover, near equiatomic Nickel-Titanium can affect the recovery rate of a single flexure or sequence the strain release for a set of flexures by means of either passive or active manipulation of the alloy's phase.

More particularly, near equiatomic Nickel-Titanium is capable of a solid state phase transformation between a high and low temperature phase where the latent energy of the transformation is either an addition or subtraction of thermal and/or mechanical energy to or from the alloy. The addition of mechanical energy alone can induce a transformation from the high to the low temperature phase, whereupon the alloy will exhibit a phenomenon known in the art as superelasticity. When in a superelastic state or a thermally and mechanically induced low-temperature state, the alloy can be deformed to a maximum recoverable strain higher than non-phase changing materials, and thus is more compliant. This response is desirable for the present invention because a greater maximum strain would permit flexure 15 to achieve a smaller bend radius for a given cross-section, and thus allow joint 11 to be more compact while having a lower mass.

Furthermore, the phase of near equiatomic Nickel-Titanium may be manipulated to retard the strain release of flexure 15, i.e., decrease the rate of its return to its neutral shape to a rate less than that of a flexure composed of a non-phase changing material, as well as coordinate the time when the strain release commences relative to other joints, to provide a degree of control over the deployment of member 39 that is not possible with flexures fabricated from non-phase changing materials. For example, phase manipulation may be used to sequence the respective strain release from a set of flexures, and thereby sequence their respective deployments. When the latent energy of the transformation is obtained from the surrounding environment, e.g., from solar radiation, or transferred to the surrounding environment, e.g., by conduction, radiation, or convection, the manipulation is considered passive. If this energy is obtained from, or transferred to, ancillary mechanical or thermal actuation systems, the manipulation is considered active.

Figure 2:
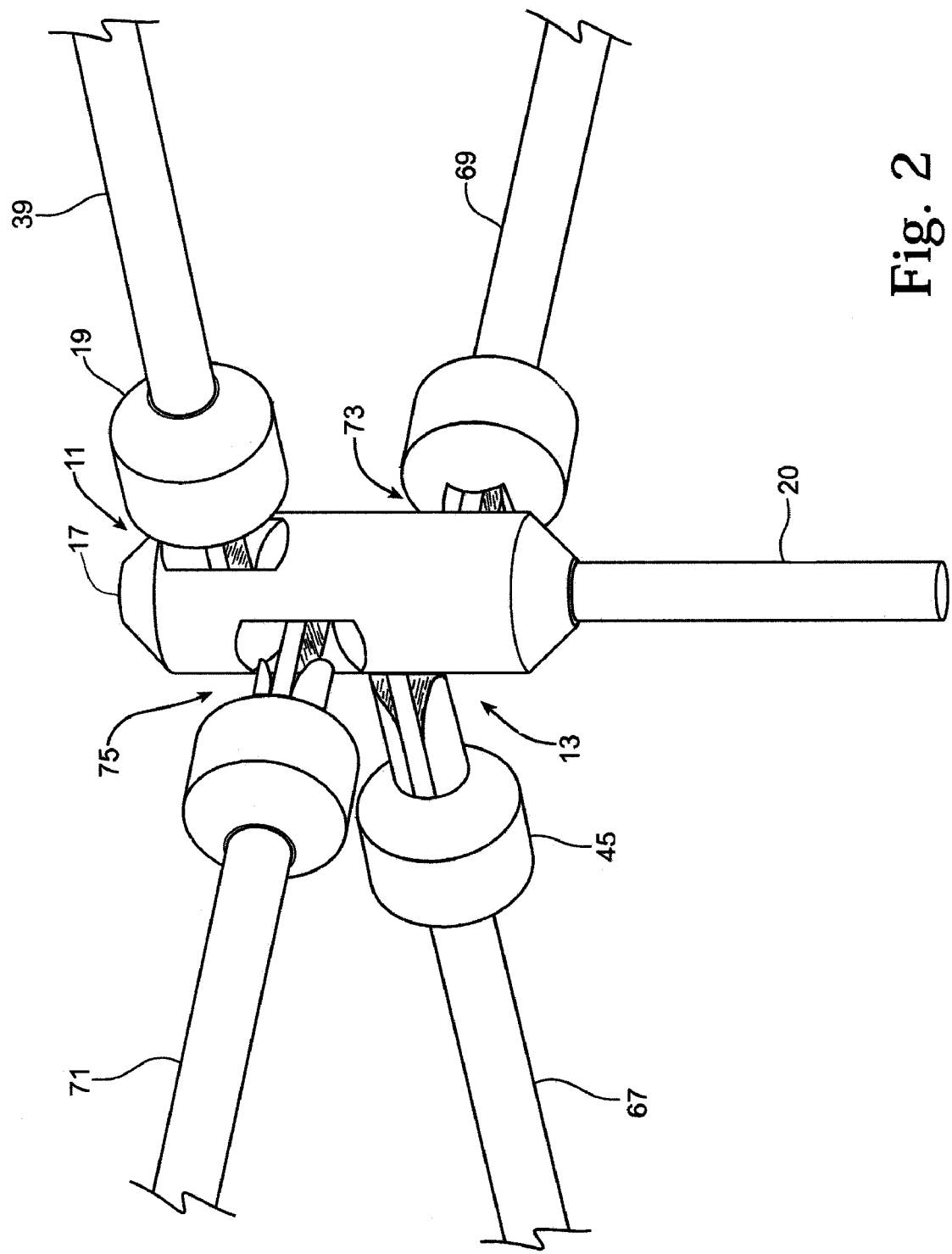
FIG. 2 is a perspective view of four joints of the present invention, with the joints unbent and the respective attached members in their deployed configuration.

FIGS. 1 and 2 show members 39 and 67 in their deployed positions. FIG. 2 also shows deployed members 69 and 71. To collapse member 39 to facilitate storage and transportation, an external normal force $F_1$ is applied to it. When the counterclockwise moment about joint 11 created by force $F_1$ exceeds the restoring moment of flexure 15, flexure 15 bends and member 39 rotates counterclockwise. The application of a normal force $F_2$ that exceeds the restoring moment of flexure 41 similarly causes flexure 41 to bend and member 67 to rotate clockwise about joint 13.

Figure 3:
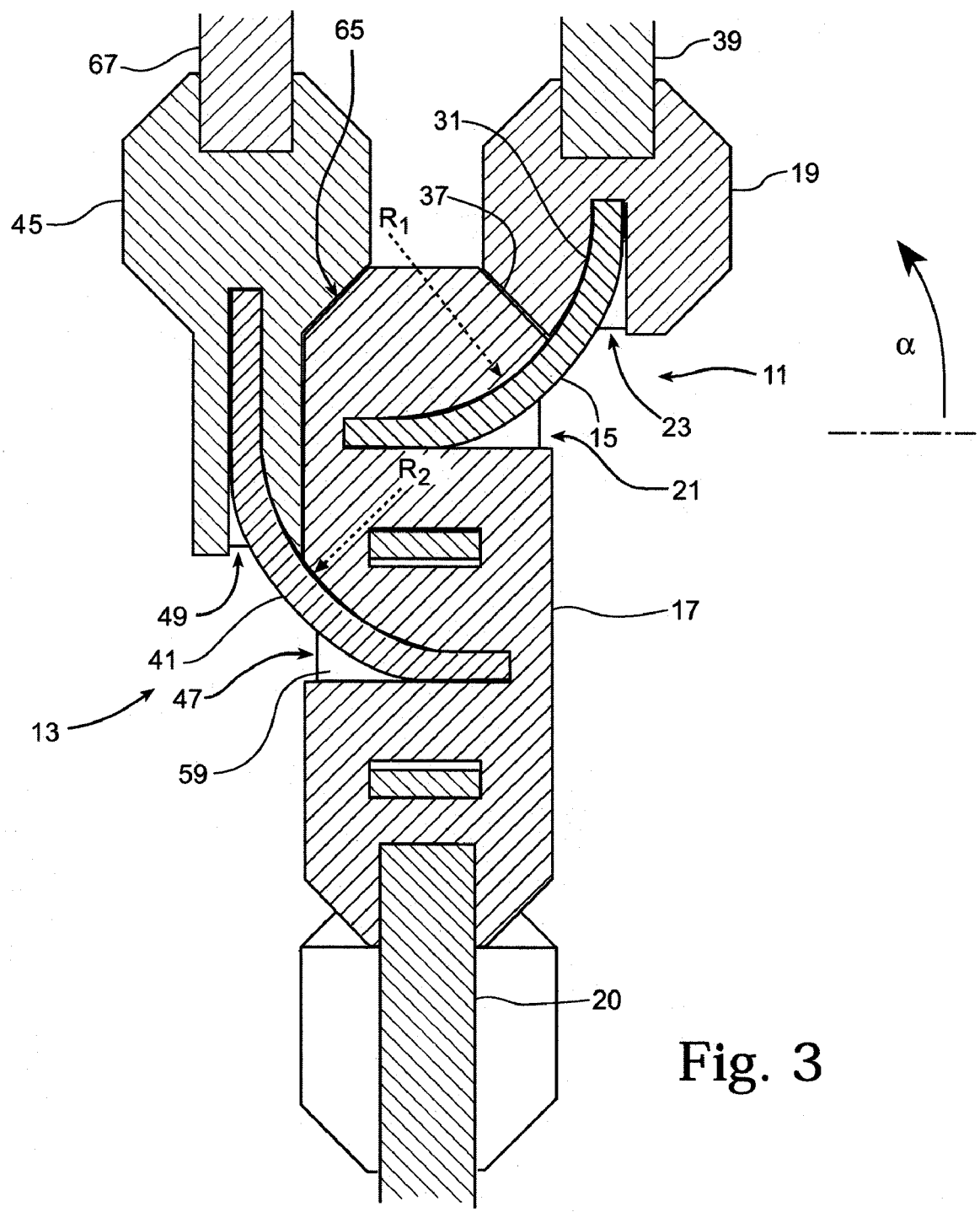
FIG. 3 is a cross-sectional view of the two joints shown in FIG. 1 with the joints bent to their maximum extent and the respective attached members in their collapsed configuration.

As shown in FIG. 3, mating surfaces 37 abut when member 39 is rotated to its fully collapsed position. This abutment limits the maximum rotation of member 39 to an angle $\alpha$ of 90° and, in combination with the radius of curvature $R_1$ of cavity surfaces 29 and 31, limits the maximum strain realized in flexure 15. The radius of curvature $R_1$ should be adjusted in view of the material used to fabricate flexure 15 to ensure that the design strain limit of flexure 15 is not exceeded.

Although surfaces 29 and 31 are described as being curved with a constant radius of curvature $R_1$, the aforementioned surfaces may, in the alternative, be elliptical or arcuate, in order to provide the desired strain profile for flexure 15 as it bends.

When member 39 is in its fully collapsed position, i.e., at an angle $\alpha$ of 90°, the work expended to rotate member 39 to this position is stored in flexure 15. While member 39 is in its collapsed position, flexure 15 is applying a restorative moment tending to rotate member 39 back to its deployed position. Thus, to maintain member 39 in its collapsed configuration, a fastening means (not shown) well known to those skilled in the mechanical arts, e.g., a fastener or launch lock, restrains it. In essence, the fastening means serves to apply a normal force $F_1$ to member 39 sufficient to overcome the restorative moment of flexure 15. Upon release or disengagement of the fastening means, the restraining normal force $F_1$ is removed and the restorative moment stored in flexure 15 causes member 39 to return to its deployed position, i.e., the neutral position shown in FIG. 1, without the aid of an external force.

Figure 4:
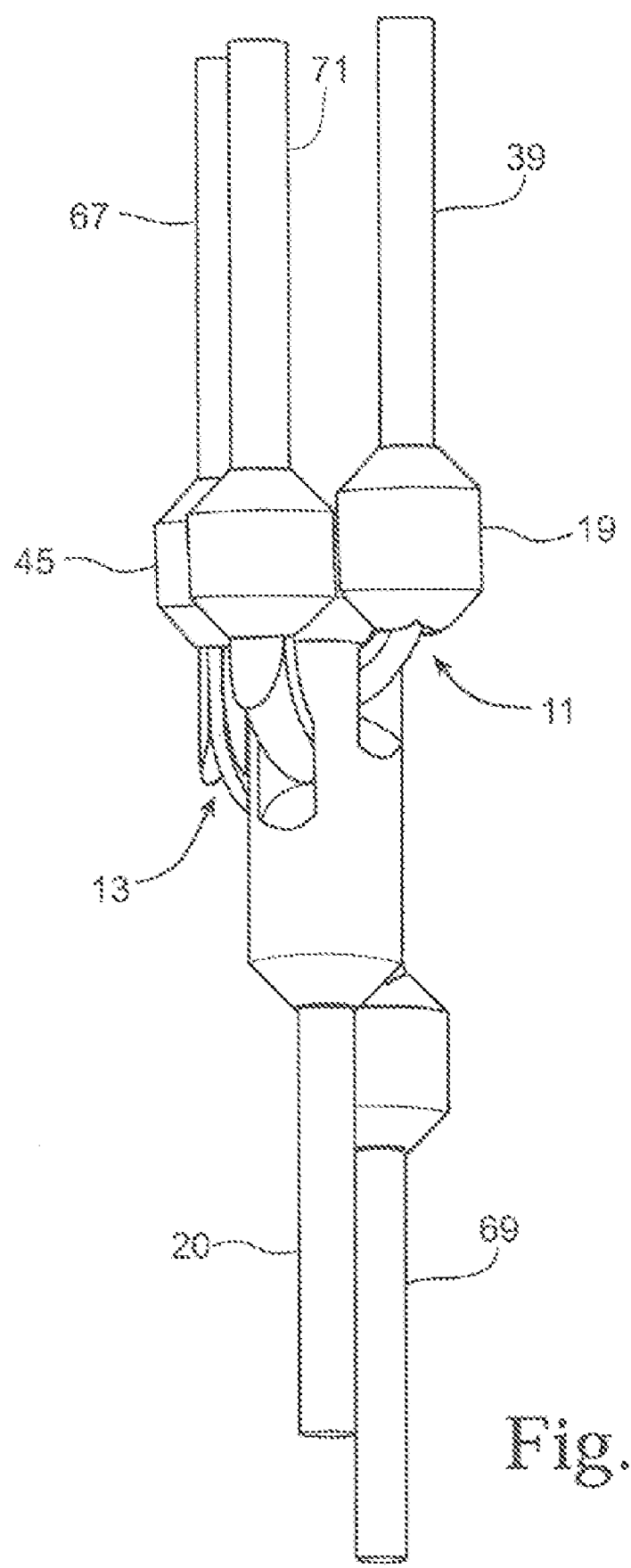
FIG. 4 is a perspective view of the four joints of the present invention shown in FIG. 2, with the joints bent to their maximum extent and the respective attached members in their collapsed configuration.

The corresponding elements of joint 13 cooperate in the same manner as described with respect to the elements of joint 11 in changing the deployed position of member 67 shown in FIGS. 1 and 2 to the collapsed configuration shown in FIGS. 3 and 4, and will not be repeated for the sake of brevity. However, it is noteworthy that the shape of mating surfaces 65 is different than the shape of mating surfaces 37 due to the different locations of joints 11 and 13 on node 17.

Flexures 15 and 41 are nested in node 17 to provide for a more compact profile when the structure is in its collapsed configuration than would be the case without such nesting. More particularly, bases 33 and 57 are separated by a nesting distance d. The width of the profile comprised of node 17 together with joints 11 and 13 decreases as the nesting distance d is increased.

FIG. 4 shows members 39, 67, 69 and 71 in their collapsed positions. Members 69 and 71 are collapsible by means of joints 73 and 75, respectively, which have corresponding elements cooperating in the manner previously described in detail with respect to joint 11 and member 39.

FIG. 5 is a perspective view of flexure 15, and shows that flexure 15 has a rectilinear cross-section. Also shown is end 77, which is attached to base region 27 of cavity 23 in connector 19. Alternatively, a joint of the present invention may incorporate arcuate flexure 79, a perspective view of which is shown in FIG. 6. Flexure 79 has an arcuate cross-section, which provides a restorative moment greater than that of a rectilinear flexure, such as flexure 15, having a similar cross-section area. Flexure 79 would thus be more stable than flexure 15 when the joint is in its deployed configuration. If joint 11 were to incorporate flexure 79, end 81 would be attached to base region 27.

It is to be understood that the preceding is merely a detailed description of an embodiment of this invention, and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A resilient joint for rotating an attached member, comprising:
   a flexure comprised of a resilient material;
   the flexure having a neutral shape;
   the flexure being attached to a structural node and also to a rigid member;
   a restorative moment being created in the flexure when the flexure is deformed from the neutral shape with the restorative moment tending to return the flexure to the neutral shape;
   the node and the member having mating surfaces that are spaced apart when the flexure is in the neutral shape and abut when the flexure is deformed by being bent to a maximum angle;
   the flexure being attached inside a node cavity in the node with the node cavity having a first shaped surface and the flexure also being attached inside a member cavity in the member with the member cavity having a second shaped surface;
   the flexure abutting both the first and second shaped surfaces when the flexure is bent to the maximum angle;
   the member being in a neutral member position when the flexure is in the neutral shape and in a compact position when the flexure is bent to the maximum angle; and
   fastening means for holding the member in the compact position when the fastening means is engaged, whereby:
   the member is restrained from returning to the neutral member position when the fastening means is engaged, and returns to the neutral member position when the fastening means is disengaged.

2. A system for collapsing a structure from a deployed configuration into a compact configuration and providing for redeployment of the structure, comprising:
   a plurality of resilient joints, with each joint being attached to a rigid member so that each member has a rotational degree of freedom about the joint to which the member is attached;
   each member having a deployed position and having a compact position when the member is rotated through an angle of rotation about the joint, relative to the deployed position;
   each joint including a flexure;
   the flexure:
   (a) being composed of a resilient material generating a restorative moment tending to return the member to the deployed position when the member is rotated from the deployed position, and
   (b) being attached to a structural node and also to the member attached to that respective joint;
   fastening means for holding each member in the compact position when the fastening means is engaged with the member;
   the node and the member having mating surfaces that are spaced apart when the member is in the deployed position, and abut when the member is rotated to the compact position, whereby:
   the angle of rotation of the member is limited;
   the flexure being attached inside a node cavity in the node, with the node cavity having a first shaped surface, and also being attached inside a member cavity in the member, with the member cavity having a second shaped surface; and
   the flexure abutting both the first and second shaped surfaces when the member is rotated to the compact position.

3. A system as defined in claim 2 further comprising:
   a first flexure being attached to a first node cavity in the node;
   a second flexure being attached to a second node cavity in the node;
   the first node cavity including a first cavity base;
   the second node cavity including a second cavity base;
   a nesting distance separating the first cavity base and the second cavity base; and
   the nesting distance being maximized.

4. A system as defined in claim 2 wherein the flexure is composed of a material selected from a group comprised of spring steel, copper-beryllium alloy, unreinforced plastic, polymer fiber reinforced plastic, fiber glass reinforced plastic, carbon fiber reinforced plastic, and a shape memory alloy.

5. A system as defined in claim 4 wherein:
   the shape memory alloy has a variable phase; and
   means for controlling the phase, whereby:
   the restorative moment has a magnitude that is controlled by the phase controlling means.

6. A system as defined in claim 2 wherein the first shaped surface and the second shaped surface are arcuate.

7. A system as defined in claim 2 wherein the first shaped surface and the second shaped surface have respective radii of curvature that are constant and equal.

8. A system as defined in claim 2 wherein the flexure has a rectilinear cross-section.

9. A system as defined in claim 2 wherein the flexure has an arcuate cross-section.

10. A system as defined in claim 2 wherein:
    each member lies substantially normal to an axis when the member is in the deployed position; and
    each member lies substantially parallel to the axis when the member is in the compact position.

* * * * *